E. J. WHITEHEAD.
METHOD OF FORMING ORNAMENTATIONS ON ARTICLES OF EARTHENWARE.
APPLICATION FILED MAY 21, 1909.

979,726.

Patented Dec. 27, 1910.

WITNESSES
R A Balderson
G L Buulere

INVENTOR
Edwin J Whitehead
by Bakewell Byrnes Parmelee
his attys

UNITED STATES PATENT OFFICE.

EDWIN J. WHITEHEAD, OF TRENTON, NEW JERSEY, ASSIGNOR TO THE TRENTON POTTERIES COMPANY, OF TRENTON, NEW JERSEY, A CORPORATION OF NEW JERSEY.

METHOD OF FORMING ORNAMENTATIONS ON ARTICLES OF EARTHENWARE.

979,726.  Specification of Letters Patent.  Patented Dec. 27, 1910.

Application filed May 21, 1909. Serial No. 497,530.

*To all whom it may concern:*

Figure 1:
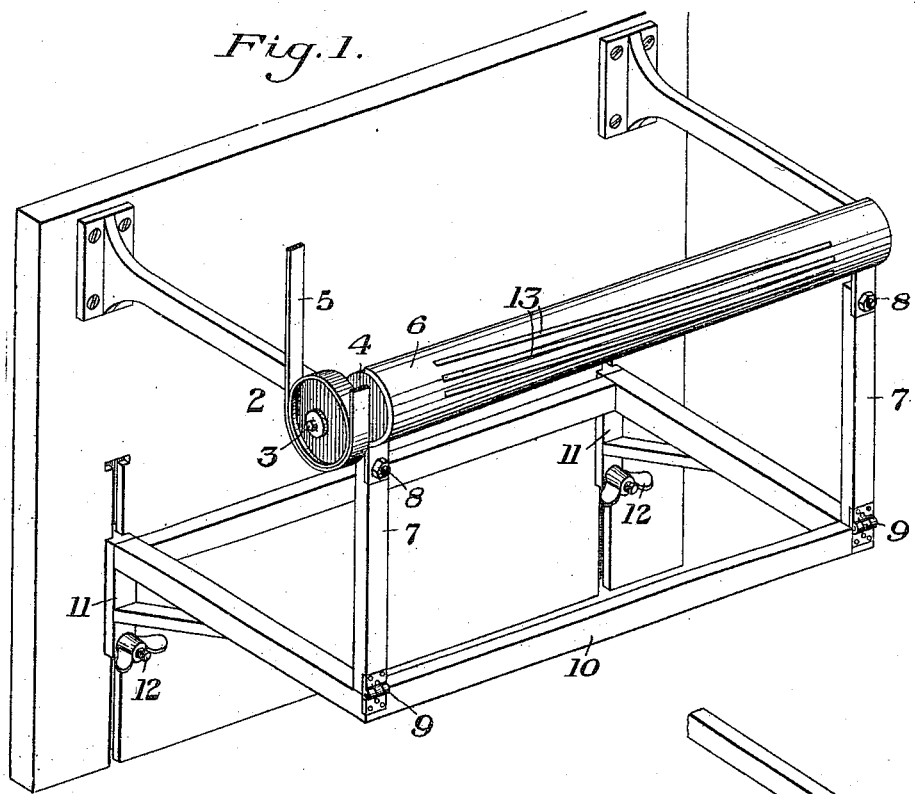
Figure 2:
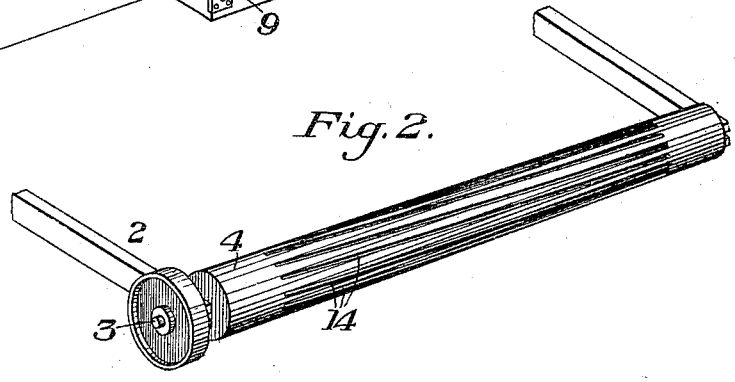
Figure 3:
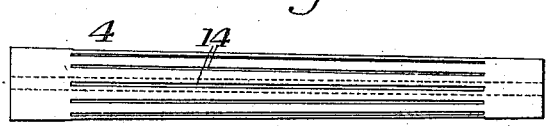

Be it known that I, EDWIN JAMES WHITEHEAD, of the city of Trenton, county of Mercer, and State of New Jersey, have invented a new and useful Method of Forming Ornamentations on Articles of Earthenware, of which the following is a specification, reference being had to the accompanying drawings, in which:

Figure 1 is a perspective of my apparatus, Fig. 2 shows an article of earthenware in position thereon, and Fig. 3 shows the finished article.

In the manufacture of articles of earthenware it has been found that great difficulty is experienced in cutting ornamentations thereon since the article warps or twists in the finishing process and the ornamentations are accordingly affected thereby.

In carrying out my invention I proceed as follows: After the clay has been mixed I take a lump of plastic clay, place it on a revolving disk called a "jigger" which has an upright in the center thereof and shape the "blank" around the upright by hand into the general shape of the article desired. This is known in the art as "throwing the blank." The blank is then drawn off the upright and is dried to the proper consistency for turning and is put on a spindle which fits the turning lathe. It is then turned, and after the turning process is completed the ornamentations are cut in. In the throwing operation a certain amount of twist is given to the clay. The article is then fired in a final firing or finishing operation, and during this operation the article warps back and practically eliminates the twist given by the throwing. Therefore, to allow for this "re-turning" or elimination of the twist I cut spiral or diagonal flutes or ornamentations into or upon the article in the same direction as the twist given the article by the throwing process. Then when the article in the final firing operation twists in the reverse direction it causes these spiral or diagonal ornamentations to become straight. Where it is desired to have ornamentations of spiral shape this can be done accurately by cutting the spiral ornamentations in a direction opposite to that of the twist given by the throwing operation and which should not be nearly as pronounced as desired in the finished article. The final firing operation will accentuate the curve of the ornamentations.

Referring to the drawings, 2 is the lathe carriage, 3 is the spindle having a "turned" article of earthenware 4 mounted thereon. The lathe is driven by the belt 5 from a source of power not shown.

6 is the templet or pattern which is fastened to the arms 7 by the bolts or clamps 8. The arms 7 have preferably a hinge connection 9 with the support 10. This support 10 is mounted on the slides 11 and can be adjusted by means of the screws 12 with reference to the lathe carriage 2 in order that articles of various sizes, and templets therefor, may be properly adjusted. The templet 6 shows a spiral pattern 13 which is to be cut upon the article. The ornamentations 14 are cut on the blank by any suitably shaped tool.

In Fig. 3 is shown a finished article on which the ornamentations have become straightened in the firing operation.

It will be seen that by my apparatus any ornamentations either of a raised or depressed character which extend longitudinally can be cut with great precision and accuracy, and that a pattern of any character can be cut on the articles by changing the templet.

The scope and character of my invention is not confined to the construction herein described and shown, since

What I claim is:

1. The method of forming ornamentations in articles of earthenware which consists in throwing the blank in one direction and cutting the ornamentations thereon in the same direction as the direction of the throw, and firing and finishing the article.

2. The method of forming ornamentations on articles of earthenware which consists in throwing the blank, turning the same, and cutting ornamentations thereon so that when the blank is fired and finished said ornamentations will become straight instead of spiral.

3. The method of forming ornamentations in articles of earthenware, which consists in throwing the blank, turning the same, and cutting ornamentations thereon so that when the blank is fired and finished said ornamentations will be twisted at an angle to their former position.

In testimony whereof, I have hereunto set my hand.

EDWIN J. WHITEHEAD.

Witnesses:
Louis H. Stuckert,
F. H. Biederback.